United States Patent Office 3,238,105
Patented Mar. 1, 1966

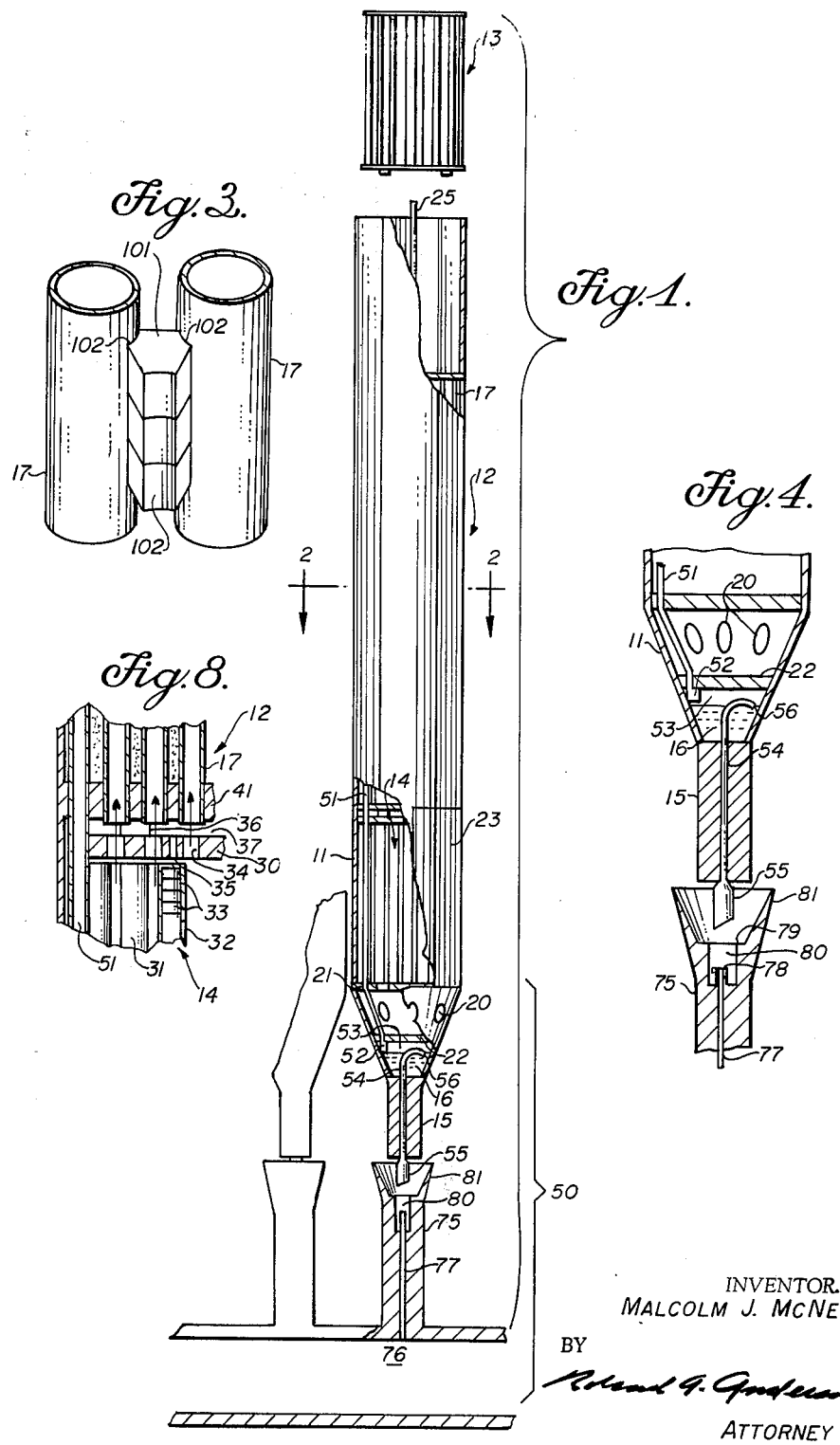

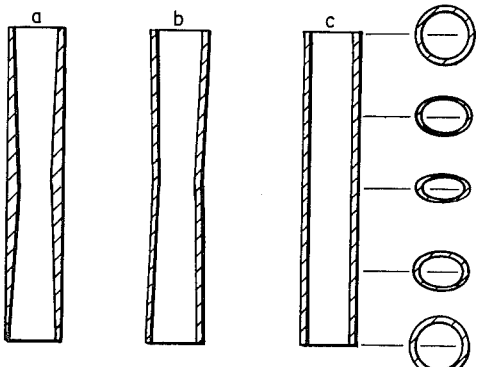
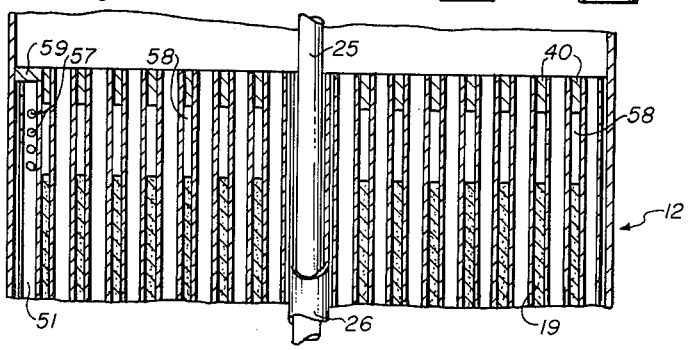
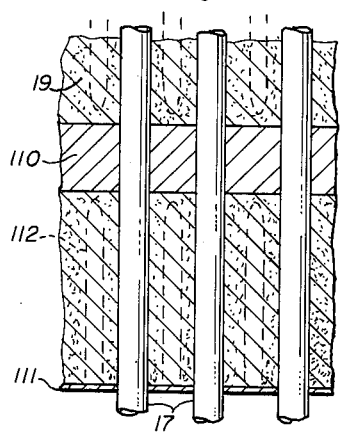
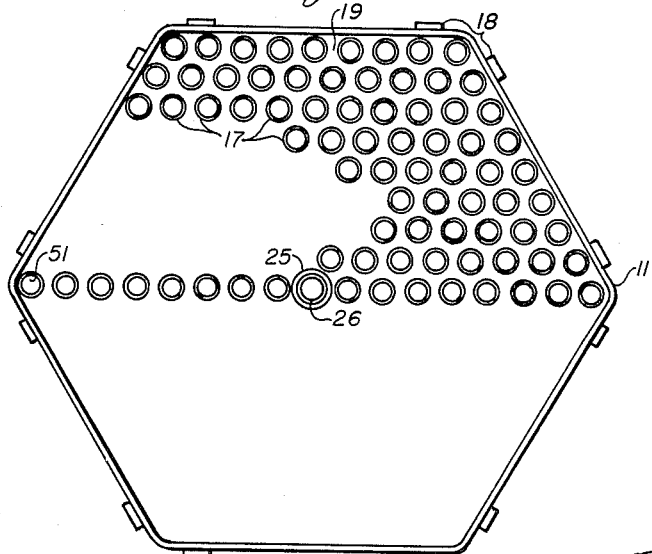
INVENTOR.
MALCOLM J. MCNELLY

3,238,105
FUEL ELEMENT ASSEMBLY FOR A NUCLEAR REACTOR
Malcolm J. McNelly, San Jose, Calif., assignor to the United States of America as represented by the United States Atomic Energy Commission
Filed June 3, 1964, Ser. No. 372,422
9 Claims. (Cl. 176—37)

This invention relates to nuclear reactors and in particular to a fuel element assembly for a liquid metal cooled, high energy (fast) neutron, breeder reactor.

Among the many problems plaguing developers of liquid metal cooled fast breeder reactors is the maintenance of high neutron economy in the face of efficiency reducing (neutron absorbing) thick metal cladding required to contain, under pressure, the radioactive fission product gases generated during fissile fuel burnup. Other problems that must be faced are: the maintenance of safe operating characteristics in the face of central melting and slumping of the fissile fuel; the maintenance of high utilization of neutrons in the breeding process to efficiently produce new fuel; and the maintenance of simplified refueling procedures to reduce reactor construction costs and prevent dangerous reactivity conditions from developing during refueling.

To overcome these problems and as an improvement over prior art devices, the fuel element assembly of this invention combines breeder blanket sections at each end of a centrally disposed fissile fuel section having a central control rod and a plurality of coolant flow tubes surrounded by fissile fuel and enclosed in a thin metallic cladding. Enclosed within the same cladding and further combined with the blanket and fuel sections is a gaseous fission product venting system arranged so that it can be coupled automatically upon placement of the fuel element assembly in the reactor core to a gaseous fission product venting system manifold separate from the fuel element assembly. Also included in the fissile fuel section are fissile fuel anti-central melting low heat generating barriers and anti-slump barriers.

By deploying breeder blanket sections proximate the ends of the fuel element section, greater utilization of fast neutrons is achieved to produce new fuel from fertile material in addition to acting as a radiation shield. With the incorporation of a gaseous fission product venting system, thin and therefore cladding of low neutron absorbing capability may be used. Since a large volume of coolant material within the core will tend to moderate the neutrons, the use of coolant tubes which reduce the coolant-to-fuel ratio will not only increase fast neutron flux but also increase operating safety. Such increases in safety are brought about by lessening an increase in reactivity from coolant voiding or coolant loss at high operating temperature since a smaller percentage of the available fast neutrons are moderated or absorbed by the coolant. The percentage fluctuation of the fast neutron flux in the reactor core is therefore less. The maintenance of simplified refueling procedures to reduce reactor construction costs and prevent dangerous reactivity conditions from developing during refueling is achieved through the use of a central control rod integral with the fuel element assembly. One or more control rods may be used to absorb neutrons thus permitting the construction of even larger unit fuel element assemblies than has heretofore been normally feasible. Thus the number of fuel element assemblies required to provide a specified reactor core can be reduced, effecting savings in the cost of handling the elements and permitting automated methods of manufacturing and assembly of the parts for each fuel element assembly. Moreover, since each fuel element assembly is equipped with its own control rod or rods, a dangerous increase in reactivity resulting from too rapid an insertion of a fuel element assembly into a reactor core during fueling is lessened.

It is, therefore, an object of this invention to provide a fissile fuel element assembly wherein neutron economy is high.

It is a further object of this invention to provide a fissile fuel element assembly having a gaseous fission product venting system arranged to safely remove radioactive fission product gases from the reactor.

It is another object of this invention to provide a fissile fuel element having improved safety characteristics during operation.

It is a further object of this invention to provide a fissile fuel element assembly wherein more effective breeding of a fissile fuel is achieved from fertile material through efficient utilization of neutrons.

It is a further object of this invention to provide a fissile fuel element assembly having a fissile fuel configuration wherein central melting of the fuel is reduced.

It is still a further object of this invention to provide a fissile fuel element assembly having a fissile fuel configuration which prevents slumping of the fuel.

It is another object of this invention to provide a fissile fuel element assembly having improved safety characteristics during refueling.

Other and more particular objects of this invention will be manifest upon study of the following detailed description when taken together with the accompanying drawing, in which:

FIGURE 1 is a longitudinal partial section of the fuel element assembly.

FIGURE 2 is a section of the fuel element assembly taken at line 2—2.

FIGURE 3 is an isometric view of a typical fuel pellet.

FIGURE 4 is a detail section of the gaseous fission product venting system at the bottom support of the fuel element assembly.

FIGURE 5 is a longitudinal section of the upper portion of the fuel element assembly showing the upper part of the fission product venting system.

FIGURE 6 is a section through the fissile fuel section showing means for preventing central melting and fuel slumping.

FIGURES 7a, 7b and 7c are longitudinal sections through typical coolant flow tubes.

FIGURE 8 is a partial section showing typical blanket construction.

Figure 9:
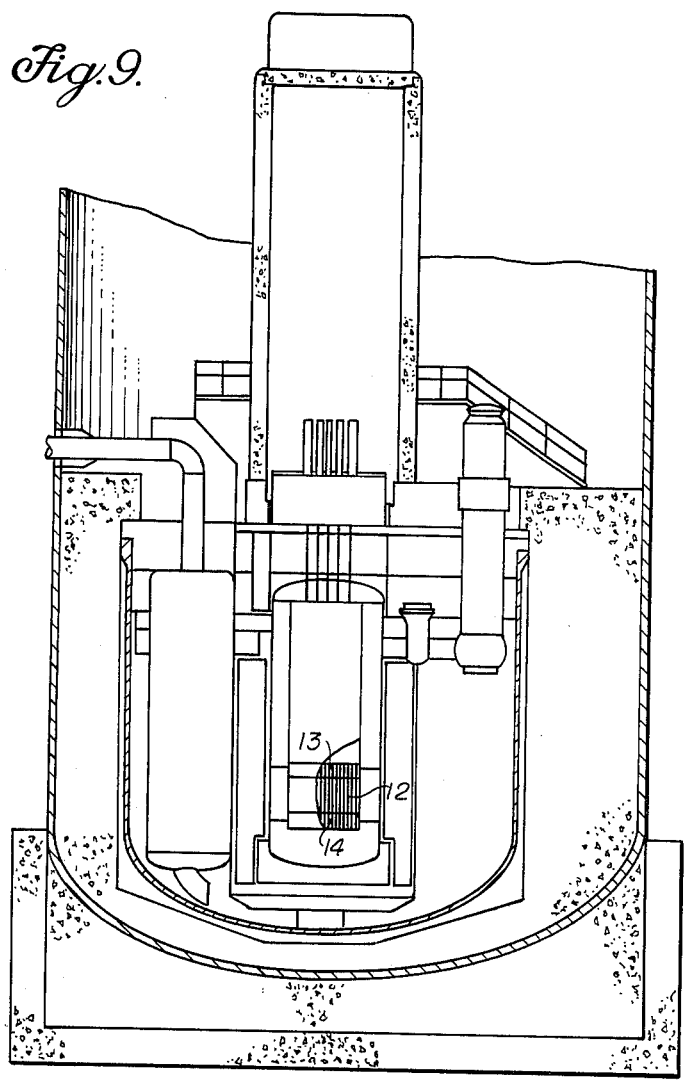
FIGURE 9 is a section through a typical liquid metal cooled, fast breeder reactor showing the location and placement of a fuel element assembly.

Referring to FIGURE 1, the fuel element assembly of the invention generally comprises an exterior hexagonal tubular cladding or can 11 enclosing a fissile fuel section 12, upper blanket member 13, lower blanket member 14, venting system 50 at the lower end thereof, a plurality of coolant flow tubes 17 extending longitudinally therethrough and centrally disposed control rod 25. Gaseous fission product venting system 50, whose main components are situated proximate the bottom of the fuel element assembly includes a fission gas vent line 51 extending the full length of fissile fuel section 12 internally adjacent cladding 11 and provided with openings 57 within the upper portion of cladding 11 (FIGURE 5) and closure plug 59 (FIGURE 5) at its upper end. At its lower end, tube 51 terminates with ball check valve 52 in fission product gas space 53 which is defined by separation plate 22 sealed as by welding or the like to the sides of the tapered portion of cladding 11 in turn sealed as by welding or the like to cylindrical bottom guide 15 of the fuel element assembly. Extending into fission product gas space 53 from below through bottom guide 15 is inverted U-tube 54 having its upper short leg end opening 56 submerged below the surface of liquid metal coolant 16 therein, which coolant in the preferred embodiment, is liquid sodium. The longer leg of U-tube 54 extending beyond bottom guide 15 terminates in flared section 55.

As a portion of the fission product venting system exterior to the fuel element assembly, there is provided a lower fuel element assembly support member 75 including central conduit 77 having flap valve 78 covering its top opening. At its lower end, conduit 77 opens into a fission gas manifold 76 of the reactor constructed as described more fully hereinafter. Flap valve 78 is arranged with the top opening in a counter sunk bore 80 below the flaring portion 81 of support 75 to prevent the flow of liquid metal coolant from the core region into fission gas manifold 76 while a fuel element assembly is absent from the core. In detail flared portion 55 of U-tube 54 and flap valve 78 are further coordinated to cause valve flap 78 to open when flared portion 55 descends around the upper portion of conduit 77. By pivotally mounting flap valve 78 to rotate about a horizontal axis and providing a portion of the valve flap to protrude on the side of the pivot opposite the flap portion, flared portion 55 can engage said protrusion forcing it down causing the flap to rise thereinto. It will be noted that the inside diameter of bore hole 80 in support 75 and the outside diameter of flared portion 55 are arranged to have a small clearance. Thus, because of the small clearance, as flared portion 55 descends engaging the protrusion of and opening flap valve 78, but before the lower end surface of guide 15 engages seating surface 79, little liquid metal coolant will be able to leak into manifold 76. More specifically seating surface 79 provided as an inwardly projecting shoulder below the upper flaring guide surface of support member 75 is arranged to match and form a seal with the bottom surface of lower guide 15, thus preventing the flow of liquid metal coolant into the fission product venting system from the reactor core while the fuel element assembly is in place.

Referring again to FIGURE 5, a gas reservoir region 58 is provided proximate the upper end of fuel section 12 between the upper end plate 40 and fissile fuel material 19 communicating with openings 57 of vent line 51. In the preferred embodiment, said region 58 is filled with granular beryllia insulation or the like. In operation, fission product gases generated by the fission or fissile fuel material within fissile fuel section 12 diffuse through said material and are accumulated in gas reservoir 58 where, due to increase in gas pressure as the fission products are produced, the gases pass through openings 57 in the upper part of fission gas vent line 51, down said vent line 51 forcing ball valve 52 to open and then enter fission product gas space 53. Plug 59 in the top end of vent line 51 is provided merely to facilitate fabrication and prevent the gases from flowing out of the fuel element and into the liquid metal coolant. Ball check valve 52 acts to prevent the backflow of fission gases or liquid metal coolant from space 53 into vent line 51. When the gas pressure in space 53 reaches a value sufficient to overcome the force necessary to expel liquid metal coolant 16 through inverted U-tube 54, i.e., when the head pressure determined by the density of the coolant and height of the U portion above tube opening 56 is exceeded, the fission product gases along with a small portion of liquid metal coolant 16 then pass through U-tube 54, past flap valve 78, through conduit 77 and into fission gas manifold 76. From manifold 76, the fission product gases are drawn off to means (not shown), exterior to the reactor, for processing and storage.

Further details as to the construction of the present fuel assembly may be seen by referring to FIGURE 2, wherein fissile fuel section 12 is seen to be encased in hexagonal cladding 11 having spacing means 18 on its exterior surface which may be either a block, bracket, protrusion or the like providing a space between fuel element assemblies forming a reactor core to allow for expansion and adequate clearance to facilitate installation of the assembly in the core. In the preferred embodiment at least three spacers per side arranged at points distributed at various levels over the surface to prevent interferences with neighboring fuel element assemblies should be used. Passing longitudinally through fissile fuel section 12 are a plurality of coolant flow tubes 17 arranged in ordered array and surrounded by fissile fuel material 19. Centrally disposed and coincident with the longitudinal axis of the fuel element assembly is control rod 25 slideable within control rod tube 26 with sufficient clearance to be easily withdrawn and inserted as required to control reactivity with the reactor core. The construction and material of said control rod 25 may be in accordance with methods and materials well known in the art. In addition, control rod 25 is further arranged to be a part of the fuel element assembly, remaining in place in the fuel element during refueling to absorb neutrons and prevent criticality from being reached should a fuel element assembly be inserted into the core of the reactor during refueling under circumstances with which a supercritical condition could arise.

Fissile fuel material 19 surrounding coolant flow tubes 17 may be either a vibratory compacted mixture of fissile fuel and moderator material (or fissile fuel, fertile material and moderator material) distributed homogeneously throughout the fissile fuel section 12 or be a compacted fuel pellet 101 (FIGURE 3) in the form of a compressed briquette, shaped to fit between coolant flow tubes 17. Here also, pellet 101 may be either a mixture of fissile fuel and moderator material; fissile fuel, fertile material and moderator material; or separate pellets of fissile fuel, fertile material and moderator material. Such separate pellets would be disposed within fuel section 12 in ordered array to expose all materials equally to neutrons generated by the fission of the fissile material. Scallops 102 on fuel pellet 101 are arranged to accurately fit the contours of coolant flow tubes 17 in order to assure high conductance heat flow. The use of scallops 102 has a two-fold advantage of first providing a greater surface for heat transfer and second, a shorter distance to the center of the pellet when compared with a cylindrical configuration in order to increase heat transmissivity so as to reduce the possibility of central melting.

In order to obviate the effects coupled with central melting of fissile fuel material 19 and to further reduce the hazards of fuel slumping which may increase reactivity brought about by melting or overheating, there are provided the anti-slump and anti-central melting means illustrated in FIGURE 6. As illustrated therein a plurality of layers 110 having a thickness approximately equal to the spacing between tubes 17 is disposed transversely at spaced intervals through fissile fuel section 12. Such layers 110 should be made, preferably from lesser enriched or lower heat producing $UO_2$ or other refractory material to act as a conductive non-melting barrier. Acting as non-heat generating barrier, said layers 110 tend to lower fuel operating temperature below melting near said layer 110 and conduct said heat to coolant 16 flowing through coolant flow tubes 17. Where central melting occurs, its boundaries will be confined within the central region of the pellet encased by unmelted fuel material. Dashed line 112 of FIGURE 6 illustrates such a boundary as might exist during normal reactor operation.

To prevent fuel slumping, several high melting point and low neutron absorbing cross-section metallic barriers 111, preferably of tungsten sheets or the like, are disposed transversely through fissile fuel section 12. Sheets 111 may be mechanically supported, as by brazing or the like, by coolant flow tubes 17. Should fuel slumping occur it will thus be confined to a small region between transverse barriers 111 and 110.

Tubes 17, in the preferred embodiment of this invention are of special construction not only to increase turbulence and facilitate heat transfer from the fissile fuel material to coolant flowing through the core, but also to further reduce the volume of coolant material within the core. Such reduction in coolant volume further reduces the hazard of a rapid increase in reactivity should voiding or loss of coolant occur. FIGURES 7a, 7b and 7c illustrate three configurations of coolant flow tubes suitable for use in the fuel element assembly of this invention. All three configurations have undulations in diameter of the tubing occurring periodically along the length of the tube at a spacing which is several times the maximum diameter of the tube. Such undulations are particularly arranged to further reduce coolant within the core when compared to a straight tube configuration without such undulations. In FIGURE 7a, the outside diameter of the tube remains constant while the inside diameter varies. In FIGURE 7b tube thickness remains constant while both inside and outside diameter varies. In contrast, FIGURE 7c illustrates a coolant flow tube where the channel shape is varied by a gradational and partial flattening of the tube. The flattened portion may be either aligned in the same plane along the tube or formed in different planes rotated about the longitudinal axis of the tube.

Tubes 17 at their lower end (FIGURE 8), are fastened and sealed as by welding or the like to bottom plate 41 and also, in a like manner, at their upper end (FIGURE 5) to top plate 40.

Upper blanket portion 13 and lower blanket portion 14 are of similar construction and purpose to each other, acting as absorbers of neutrons both for shielding and producing (breeding) new fuel. Lower blanket portion 14 comprises perforated end plates 30, having a plurality of perforations or openings 34 to permit the flow of coolant through the blanket, holding, in ordered array by means of pins 35, a plurality of fertile (breeder) material containers 31. Containers 31, around the outside of which flows the reactor coolant material, comprise an outer sealed tube 32 defining the enclosure for fertile (breeder) material 33. Said material may be in the form of compressed pellets, disks, coins, rods, or the like of material to be described hereinafter. When upper blanket portion 13 is arranged to be installed in the fuel element from above, lower blanket portion 14 is arranged to be installed in the fuel element from the side through removable cladding portion 23 in the lower portion of cladding 11, to maintain the integrity of the fission product venting system and avoid disturbing fuel section 12. Upper and lower blankets 13 and 14 are maintained in spaced relationship with the ends of fissile fuel section 12 by means of a number of spacers 36. Said spacers are arranged between the coolant flow channels to avoid blocking the flow of coolant and are of sufficient thickness to form plenum 37 in order to permit an even flow pattern through both fuel section 12, coolant tubes 17 and upper and lower blankets 13 and 14. The entire assembly, fuel section 12 and blankets 13 and 14, are supported within cladding 11 by perforated support plate 21.

In the fuel element assembly of this invention the breeding process includes both the production of new fuel to be later extracted by chemical means for use in other reactors and also the production of new fuel within the fuel element to be consumed in situ therein. A typical process for producing new fuel such as Pu–239, well known in the art is achieved from the following reaction:

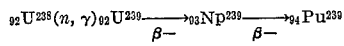

In a like manner, well known in the art, $U^{233}$ can be obtained using $Th^{232}$ as the fertile material. Thus, by combining fertile as well as fissile material together in fissile fuel section 12, the $Pu^{239}$ or $U^{233}$ fuel produced can be consumed to achieve higher burnup. By removing the blanket section 13 and 14, the $Pu^{239}$ or $U^{233}$ can be chemically removed for use in other reactors.

When operating, the reactor coolant 16 will flow, either by convection or forced flow, through openings 20 proximate the bottom of the fuel element assembly in cladding 11, pass up through perforated support plate 21, lower blanket 14, plenum 37 into coolant flow tubes 17. After having its temperature increased through heat transfer from fissile fuel 19 through the walls of tubes 17 aided by turbulence producing means illustrated in FIGURES 7a, 7b, or 7c, coolant 16 then passes through upper blanket 13 into a plenum (not shown) mixing with other coolants heated by other similar fuel elements within the core.

Referring to FIGURE 9, a section through a typical liquid metal cooled, fast breeder reactor illustrates the location and placement of the fuel element assembly of this invention.

As an example of a typical embodiment of this invention, the parameters for a fuel element having a power generation capability of 40 mw.(t) are tabulated in Table I below.

TABLE I

Dimensions:
```
    Overall length _____  5'6"
    Active length _____  4'
    Fuel element width (across flaps) _____  7.5"
    Cladding thickness (outer can) _____  0.150"
    End plate thickness _____  0.500"
    Coolant flow tubing I.D. _____  0.300"
    Coolant flow tubing pitch _____  0.500"
    Coolant flow tubing wall thickness ____  0.030"
    Control rod tube I.D. _____  0.600"
    Weight (lbs.) _____  750
```
Core composition ratios (volume percent):
```
    Fissile fuel (12% enriched U235) _____  40
    Void and other _____  5
    Coolant (liquid sodium) _____  35
    Structure (stainless steel) _____  20
```
Performance:
    Coolant flow—approx. .075×10⁶ lbs./hr.
    Coolant temperature differential—600° F.
    Specific power—200 kw./kg. total fissile and fertile fuel material.
    Fuel element power—approx. 40 mw.(t).

Although the foregoing embodiment has been described in detail, there are obviously many other embodiments and variations in configurations which can be made by a person skilled in the art without departing from the spirit, scope or principle of this invention. Therefore, this invention is not to be limited except in accordance with scope of the appended claims.

What is claimed is:

1. In a fuel element assembly for a liquid metal cooled, fast breeder reactor, the combination comprising means defining a fissile fuel section, means defining breeder blanket sections proximate the ends of said fissile fuel section, means defining a cladding enclosing said fissile fuel section and said breeder blanket sections, a venting system including a collector conduit extending from the upper portion of said fissile fuel section to an exterior manifold connected in the lower portion of said cladding and including a unidirectional differential pressure flow control means for venting gaseous fission products from said assembly into said manifold, a plurality of coolant flow tubes extending in ordered array through said fissile fuel section, conductive heat sink barriers disposed transversely in said fissile fuel section at distributed intervals and arranged in heat transfer relation to said coolant flow tubes to prevent central melting of said fuel, a plurality of mechanical support barriers arranged in said fissile fuel section to prevent slumping of said fuel, control means centrally disposed in said fissile fuel section, combined and coacting to form a subcritical fuel element assembly.

2. In a fuel element assembly for a liquid metal cooled, fast breeder reactor, the combination in accordance with claim 1 wherein said fissile fuel section comprises a plurality of compressed pellets of a mixture of fissile fuel and moderator material, said compressed pellets having flat sides in contact with adjacent pellets and scallops formed to fit in heat transfer relation with said coolant flow tubes.

3. In a fuel element assembly for a liquid metal cooled, fast breeder reactor, the combination in accordance with claim 1 wherein said fissile fuel section comprises a plurality of compressed pellets of a mixture of fissile fuel, moderator material and fertile material, said compressed pellets having flat sides in contact with adjacent pellets and scallops formed to fit in heat transfer relation with said coolant flow tubes.

4. In a fuel element assembly for a liquid metal cooled, fast breeder reactor, the combination in accordance with claim 1 wherein said fissile fuel section comprises a plurality of compressed pellets of fissile fuel arranged in ordered array with a plurality of compressed pellets of moderator material, said compressed pellets having flat sides in contact with adjacent pellets and scallops formed to fit in heat transfer relation with said coolant flow tubes.

5. In a fuel element assembly for a liquid metal cooled, fast breeder reactor, the combination in accordance with claim 1 wherein said fissile fuel section comprises a plurality of compressed pellets of fissile fuel arranged in ordered array with a plurality of compressed pellets of moderator material arranged in ordered array with a plurality of compressed pellets of fertile material, said compressed pellets having flat sides on contact with adjacent pellets and scallops formed to fit in heat transfer relation with said coolant flow tubes.

6. In a fuel element assembly for a liquid metal cooled, fast breeder reactor, the combination in accordance with claim 1 wherein said heat sink barriers consist of material selected from the group U–238 and Th–232.

7. In a fuel element assembly for a liquid metal cooled, fast breeder reactor, the combination in accordance with claim 1 wherein said fissile fuel consists of material selected from the group U–235, Pu–239 and U–233.

8. In a fuel element assembly for a liquid metal cooled, fast breeder reactor, the combination in accordance with claim 1 wherein said breeder blanket sections comprise a plurality of tubes arranged in ordered array, said tubes defining means for containing material selected from the group U–238 and Th–232.

9. In a fuel element assembly for a liquid metal cooled, fast breeder reactor, the combination in accordance with claim 1 wherein said unidirectional differential pressure flow control means comprises means defining a fission product gas space proximate the lower portion of said cladding, means defining a unidirectional flow valve proximate the lower end of said collector conduit in said gas space and means defining an inverted U-tube liquid metal pressure operated gas flow control for venting gaseous fission products from said assembly into said manifold.

References Cited by the Examiner

UNITED STATES PATENTS

| | | | |
|---|---|---|---|
| 3,140,237 | 7/1964 | Peterson et al. | 176—18 |
| 3,141,829 | 7/1964 | Fortescue et al. | 176—37 X |
| 3,156,625 | 11/1964 | Harty et al. | 176—40 |

FOREIGN PATENTS

| | | |
|---|---|---|
| 930,600 | 7/1963 | Great Britain. |

REUBEN EPSTEIN, *Primary Examiner.*